Aug. 9, 1955  C. M. CORNWALL  2,715,034
LOAD-EQUALIZING HITCH FOR TRAILERS
Filed April 16, 1954  2 Sheets-Sheet 1
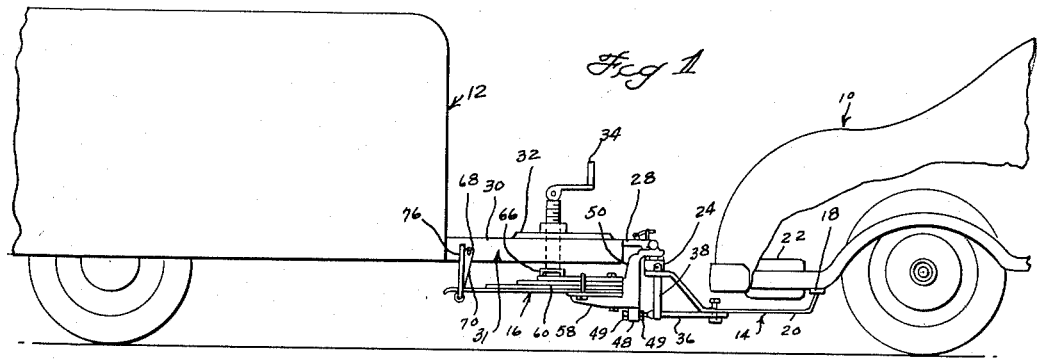
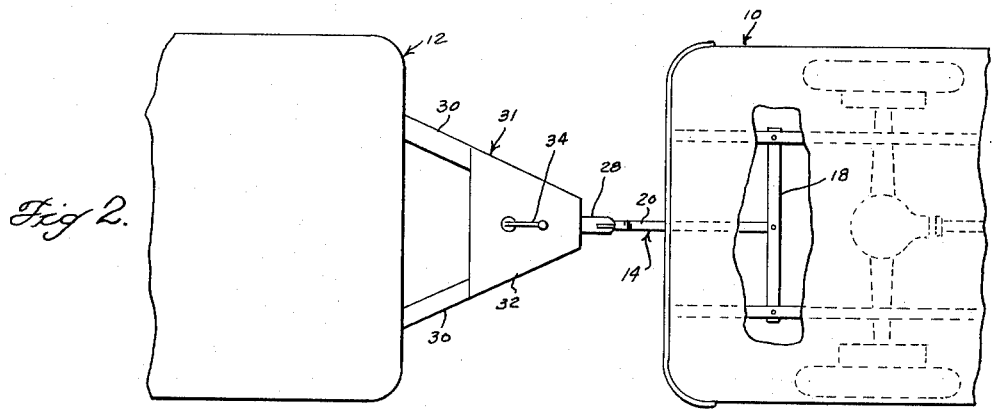
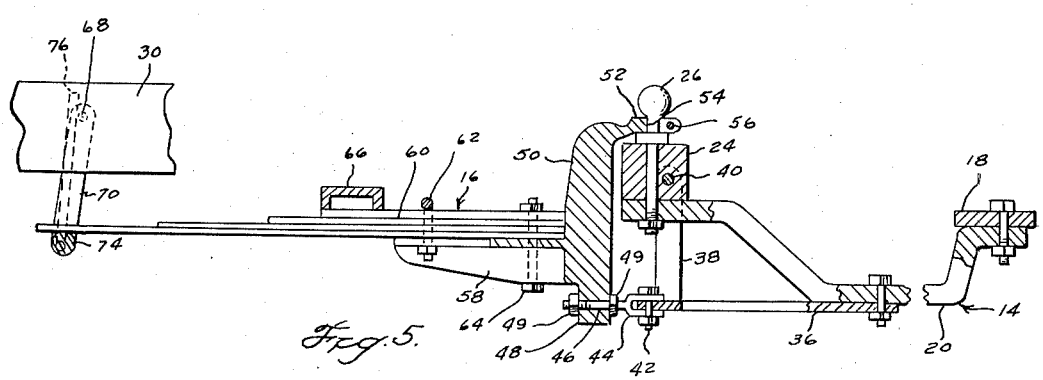
INVENTOR
CLAIR M. CORNWALL
BY
McMorrow, Berman & Davidson
ATTORNEYS

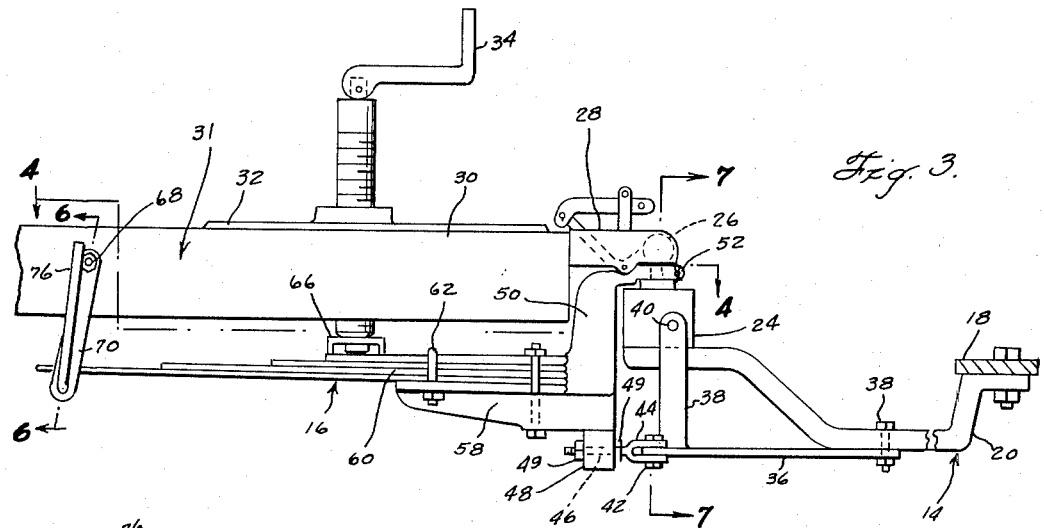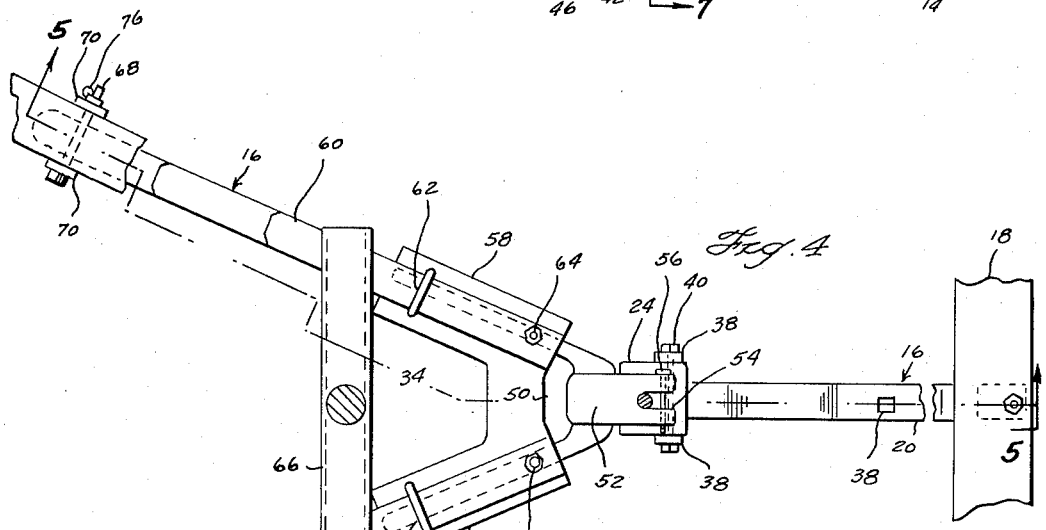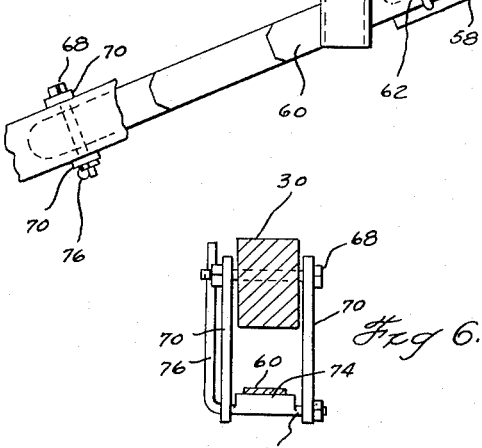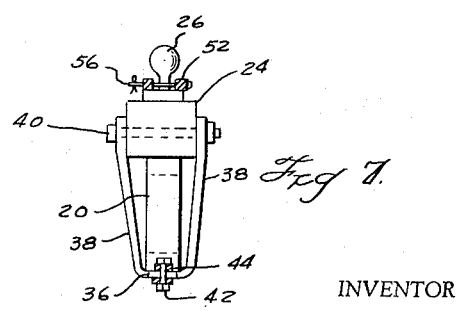

United States Patent Office 2,715,034
Patented Aug. 9, 1955

2,715,034

LOAD-EQUALIZING HITCH FOR TRAILERS

Clair M. Cornwall, Lakeland, Fla.

Application April 16, 1954, Serial No. 423,810

5 Claims. (Cl. 280—406)

This invention relates to a device usable in association with a generally conventional trailer hitch, and adapted to relieve the conventional ball joint of the full load, while at the same time distributing the weight of the towed vehicle further forwardly on the frame of the touring vehicle than has heretofore been true.

An important object of the invention is to provide a load-equalizing device as stated which will be so designed as to level both the towed and towing vehicle without the use of overload springs.

Another object is to provide a device as described which, by reason of the distribution of the weight of the towed vehicle in the manner referred to above, will place more weight on the front tires of the towing vehicle than has heretofore been true, thus to reduce wear on the rear tires of said towing vehicle. Usually, when a heavy towed vehicle is hitched to a towing vehicle such as a conventional passenger automobile, weight is taken off the front tires, and is imposed on the rear of the towing vehicle, thus causing excessive wear while at the same time reducing dangerously the stability of the towing and towed vehicles during movement over a road surface.

Another object of importance is to provide a device as described wherein the uniform distribution of the weight in the manner referred to above will be accompanied by a stabilizing effect upon the towing and towed vehicles, which stabilizing effect will eliminate road sway, even when the trailer is being pulled at relatively high speed over a rough road surface.

Another object is to provide a device as stated which will constitute a safety device, in the event the trailer becomes accidentally unhitched from the conventional draw bar assembly of the towing vehicle.

Yet another object is to provide a device as stated which will be mountable upon a generally conventional towing assembly of an automobile with a minimum of difficulty and without the necessity of modifying or redesigning the conventional hitch means.

Other objects will appear from the following description; the claims appended thereto, and from the annexed drawings, in which like reference characters designate like parts throughout the several views, and wherein:

Figure 1 is a side elevational view of a load-equalizing device formed in accordance with the present invention, as it appears when associated with a towing and towed vehicle, and with a conventional hitch connecting said vehicles;

Figure 2 is a fragmentary top plan view of the vehicles, hitch, and load-equalizing device;

Figure 3 is an enlarged view partly in side elevation and partly in section, showing the load-equalizing device and the associated parts of the hitch, traction vehicle, and trailer;

Figure 4 is a plan sectional view taken substantially on line 4—4 of Figure 3;

Figure 5 is a longitudinal sectional view taken substantially on line 5—5 of Figure 4;

Figure 6 is a transverse sectional view taken on line 6—6 of Figure 3; and

Figure 7 is a transverse sectional view on line 7—7 of Figure 3.

The reference numeral 10 has been applied generally to a traction vehicle such as a conventional passenger automobile. The reference numeral 12 has been similarly applied to a conventional towed vehicle such as a house trailer, the traction and towed vehicles being connected by a generally conventional hitch designated generally by the reference numeral 14. The load-equalizing device constituting the present invention has been designated generally at 16, and as shown in the drawing, is attached to the hitch 14.

Considering the construction of the hitch 14, it is believed sufficient to note that said hitch is attached to a cross bar 18 extending transversely between the longitudinal frame members of the vehicle, forwardly of the rear end of the vehicle. A draw bar 20 is fixedly secured at its leading end to the mid-length portion of the cross bar 18 (Figure 2), said draw bar projecting rearwardly from the cross bar 18, beyond the rear end of the vehicle. At its rear end, the draw bar 20 is offset upwardly. The purpose of this construction is to permit the draw bar to be extended, intermediate its ends, below the conventional fuel tank 22 of the vehicle. After being extended rearwardly beyond the fuel tank 22, the draw bar is again extended upwardly, to provide a support for a ball element support block 24. Support block 24 is fixedly secured in any suitable manner to the upwardly offset rear end of draw bar 20, and is provided with a vertical bore receiving the shank of a ball element 26.

The trailer hitch 14 also includes a socket member or ball seat 28 projecting forwardly from the front end of the tongue 31 of the trailer 12. Tongue 31, in the illustrated example, is comprised of forwardly converging arms 30 rigidly secured at their divergent ends to the leading end of the trailer body, the arms 30 being provided, at their convergent ends, with a cover plate 32 that is fixed secured to the arms 30 in any suitable manner. The ball socket member 28 is fixedly secured to the convergent ends of the arms 30, and is adapted to receive the ball element 26 when the trailer is to be hitched to the towing vehicle.

Threadedly engaged in the tongue 31, centrally of the cover plate 32, is a vertically disposed jack screw 34. The jack 34 is a conventional part of the trailer assembly, but is, in accordance with the invention, used as a means capable of exerting pressure upon the load-equalizing device, in a manner to be presently made apparent hereinafter.

Formed in the block 24 is a transverse bore, opening upon the opposite side surfaces of said block 24 and extending through the transverse bore is a cross pin 40, the ends of which are connected to the upper ends of upwardly diverging yoke arms 38 (Figure 7). The yoke arms 38, at their lower or convergent ends, are integral or otherwise made rigid with the opposite sides of the rear end of a horizontally disposed draw bar extension member 36.

The yoke arms 38 and the draw bar extension member 36 constitute parts of the load-equalizing device constituting the invention, and are adapted to reinforce the draw bar assembly designated at 14.

At the rear end of the extension member 36, there is formed an opening receiving a bolt 42 passing through the bifurcated front end 44 of a connecting pin 46 that extends through an opening formed in the depending extension 48 of a lever 50 disposed substantially vertically rearwardly of the draw bar assembly 14, and integrally formed at its upper end with a forwardly projected extension 52 having a slot 54 (Figure 4) receiving the shank of the ball element 26.

For the purpose of preventing relative separation of the extension 52 and ball element shank, a pin 56 is provided, extending across the slot adjacent the open end thereof.

Integrally formed upon the lever 50, intermediate the ends thereof, are rearwardly diverging, generally horizontal spring support members 58, and it will be noted that the members 58, together with the main portion of the lever 50 and the forwardly projected extension 52 and depending extension 48, define a bell crank lever. Thus, the fulcrum point of the lever is the point of its connection to the ball element shank, the lever swinging in a vertical plane about said fulcrum point. When the lever is swung, for example, counterclockwise in Figure 5, the lower end of the lever defined by the extension 48 exerts pressure against the rear end of the draw bar assembly at a location spaced from the ball element 26, said pressure against the draw bar assembly being exerted to the right in Figure 5. The swinging of the lever in a direction to exert pressure against the draw bar assembly in this manner is effected by the exertion of force against the rearwardly projecting members 58 in a downward direction. It is thus appropriate to state that the bell crank lever is fulcrumed intermediate its ends immediately below the ball portion of ball element 26, with downward pressure upon one end of the lever being effective to cause the lever to exert force along horizontal lines at its other end.

Laminated springs 60 are provided, adjacent their front ends, with U-clamps 62 whereby said springs are secured to the divergent rear ends of the spring support members 58. At their front ends, the springs 60 are anchored to the members 58 by vertically disposed anchoring bolts 64 passing through the laminations of the springs and through the members 58. The openings in the members 58 through which the anchoring bolts 64 extend are preferably of slot-like formation, thus to permit the springs to be adjusted to selected angular relationships, to compensate for differences in the tongue widths of various trailers 12.

In any event, the springs 60 diverge rearwardly from the lever 50, as best shown in Figure 4, the springs being extended substantially horizontally, in parallelism with the arms 30 of tongue 31.

It is desired that rotation of the jack screw be effective to exert downward pressure upon both springs simultaneously, intermediate the ends of the springs, and as one example of a means whereby this pressure can be transmitted to the springs, I have shown a cross piece 66 swivelled to the lower end of the jack screw, the ends of said cross piece bearing downwardly upon the springs intermediate the ends of the springs.

At their divergent ends, the springs are shackled to the undersides of their associated tongue arms 30. The shackles have been shown to particular advantage in Figures 5 and 6, and as will be noted, upper shackle bolts 68 are etxended transversely through the respective tongue arms 30, the ends of the upper shackle bolts passing through openings formed in the upper ends of depending links 70. The links 70 are disposed at opposite sides of the respective arms 30, and at their lower ends are formed with openings receiving the horizontally disposed lower shackle bolts 72. Each lower shackle bolt 72, in the space between the links 70, has a cam or eccentric enlargement 74, the springs 60 bearing downwardly against said enlargements of the respective lower shackle bolts. At one end, each lower shackle bolt is integrally formed with an upwardly extending arm 76, said arm constituting a handle.

It will be seen that the springs can be forced downwardly by the jack screw, when the jack screw is rotated in a direction to thread the same downwardly within the tongue of the trailer. Subsequently, if desired, the tension of the springs can be increased by swinging the handles 76 upwardly against the upper shackle bolts, thereby to rotate the cams to positions in which they will force the rear ends of the springs upwardly, thereby increasing the tension of the springs.

In use of the device, the load-equalizing means 16 can be assembled with the conventional trailer hitch or draw bar assembly 14 merely by insertion of pins 42, 56. Thereafter, the towing vehicle can be backed up to the trailer, and the trailer can be hitched to the draw bar assembly in the usual manner. The shackles at the rear ends of the springs are then swung into spring-supporting positions. Subsequently, to equalize the load between the trailer and towing vehicle, the jack screw is rotated in a direction to cause the cross piece 66 thereof to bear downwardly upon the mid-length portions of the springs. This tends to lift the ball socket member 28, and hence the front end portion of the trailer, while at the same time causing the lever 50 to be rocked counter-clockwise about its fulcrum point when viewed as in Figure 3. This rocking movement of the lever causes the lower end of the lever to press forwardly against the draw bar assembly, at a location spaced away from the ball element of the draw bar assembly. Pressure is thus exerted on the draw bar assembly which is taken up by the towing vehicle at a location spaced forwardly of the ball joint. This relieves the rear end of the vehicle of the full weight of the trailer, causing the towing and towed vehicles to be leveled. The ride is thus stabilized, and the stabilized effect remains even when the trailer is pulled at relatively high speeds over a comparatively rough road surface.

It is to be noted that initial adjustments of the position of the lever 50 relative to the draw bar assembly can be made, by means of lock nuts 49 threaded upon the connecting pin 46. The lock nuts 49 can be loosened, to permit the depending extension 48 of the lever to be shifted longitudinally of the connecting pin 46 to a selected position. This serves, in turn, to swing the divergent rear ends of the springs 60 upwardly or downwardly as the case may be, to locate the springs at a selected position relative to the tongue 31 of the trailer. After the desired adjustment has been made, the lock nuts 49 are threaded against the opposite surfaces of the depending extension 48, to preserve the selected adjustment.

Heretofore, the main difficulty experienced in connection with devices of this type has arisen from the fact that there is, ordinarily, an excessive strain on the locking device. In some devices, a forward force is exerted on the ball as well as an upward pull on the socket. This causes an excessive amount of wear on the locking device in the socket, and as a result, numerous accidents have occurred, due to the fact that the locking device becomes worn to the extent that it fails to function properly.

The hitch illustrated and described herein is so designed as to eliminate strain in any direction on either the ball or socket, other than the normal amount for which these parts are designed. This characteristic obtains due to the fact that the adjustments for leveling the traction vehicle and trailer exert no pressure on either the ball or socket. The adjustment means 74, 49 affect the position of the springs only in relation to an imaginary line drawn through the common center line of the ball and of the pin 42, thereby raising or lowering the rear ends of the springs.

If the jack screw were to be used to exert pressure against the cross piece 66, it would cause pressure to be exerted against the locking device, as in other hitches. In fact, it is believed that the illustrated hitch has a tendency to hold the socket down on the ball, as distinguished from the tendency of conventional hitches wherein upward and forward pressure is exerted.

In the illustrated structure, considerable forward force is exerted, but this force is directed at the base of the ball, rather than through the socket and to the ball. This, it is believed, is a safety feature of decided importance which is not found in conventional hitches.

In attaching the trailer to the traction vehicle, after proper installation of the draw bar extension means 36, 38, and the spring shackles on the trailer frame, the first step is to mount the unit on the traction vehicle by insertion of pins 56, 42. Then, the vehicle is backed up to the trailer and the ball and socket are connected. With the lock in place, the user raises the vehicle and trailer to maximum height with the trailer jack. If the installation has been properly accomplished, the shackles on the trailer frame will at this point barely clear the ends of the springs and will will swing into place. If the eccentric lever is being used, it is now swung into place. It may be noted that light trailers may not require the use of an eccentric means 74 such as shown in the drawing.

The jack is now released, and a downward force will, as a result, be exerted on the ball, with the springs thus assuming part of the load, thereby to distribute the weight further forward on the traction vehicle and further to the rear on the trailer.

It has been found that in many instances, the cross piece 66 might be eliminated, since experimental testing has shown that the device will operate satisfactorily without said cross piece. Whether or not the cross piece is used, the device can be attached to or removed from the associated traction vehicle in a minimum of time, with the construction being such as to eliminate the need for added adjustments each time the traction vehicle is subsequently connected to the trailer.

It is believed apparent that the invention is not necessarily confined to the specific use or uses thereof described above, since it may be utilized for any purpose to which it may be suited. Nor is the invention to be necessarily limited to the specific construction illustrated and described, since such construction is only intended to be illustrative of the principles of operation and the means presently devised to carry out said principles, it being considered that the invention comprehends any minor change in construction that may be permitted within the scope of the appended claims.

What is claimed is:

1. A load-equalizing device for trailers comprising, in combination with a draw bar assembly of a towing vehicle having a ball element, and with the tongue of a towed vehicle having a ball socket member receiving the ball element: a lever pivoted on the draw bar assembly to swing within a vertical plane and having one end disposed to exert pressure against said draw bar assembly at a location spaced forwardly of the assembly from the ball element; spring means anchored at one end to the lever and projecting rearwardly therefrom below the tongue; and a screw threaded in said tongue and bearing against the spring means, for transmitting pressure against the lever through the spring means tending to swing the lever into pressure exerting engagement at said end thereof with the draw bar assembly.

2. A load-equalizing device for trailers comprising, in combination with a draw bar assembly of a towing vehicle having a ball element, and with the tongue of a towed vehicle having a ball socket member receiving the ball element: a bell crank lever fulcrumed on the draw bar assembly to swing within a vertical plane and having one end disposed to exert pressure against said draw bar assembly at a location spaced forwardly of the assembly from the ball element; spring means anchored at one end to the other end of the lever and projecting rearwardly therefrom below the tongue; and a screw threaded in said tongue and bearing downwardly against the spring means, for transmitting pressure against the lever through the spring means tending to swing the lever into pressure-exerting engagement at said one end thereof with the draw bar assembly.

3. A load-equalizing device for trailers comprising, in combination with a draw bar assembly of a towing vehicle having a ball element, and with the substantially horizontally extending tongue of a towed vehicle having a ball socket member receiving the ball element: a bell crank lever fulcrumed on the draw bar assembly to swing within a vertical plane and having one end disposed to exert a forward pressure against said draw bar assembly at a location spaced away from the ball element on said assembly; spring means anchored at one end to the other end of the lever and projecting rearwardly therefrom below and in substantial parallelism with the tongue; and a screw threaded in said tongue and bearing downwardly against the spring means, for transmitting pressure against the lever through the spring means tending to swing the lever into pressure-exerting engagement at said one end thereof with the draw bar assembly.

4. A load-equalizing device for trailers comprising, in combination with a draw bar assembly of a towing vehicle having a ball element, and with the substantially horizontally extending tongue of a towed vehicle having a ball socket member receiving the ball element: a bell crank lever fulcrumed on the draw bar assembly to swing within a vertical plane and having one end disposed to exert a forward pressure against said draw bar assembly at a location spaced away from the ball element on said assembly; spring means anchored at one end to the other end of the lever and projecting rearwardly therefrom below and in substantial parallelism with the tongue; shackle means connecting the spring means to said tongue at the other end of the spring means; and a screw threaded in said tongue and bearing downwardly against the spring means intermediate the opposite ends thereof, for transmitting pressure against the lever through the spring means tending to swing the lever into pressure-exerting engagement with the draw bar assembly at said one end of the lever.

5. A load-equalizing device for trailers comprising, in combination with a draw bar assembly of a towing vehicle having a ball element, and with the substantially horizontally extending tongue of a towed vehicle having a ball socket member receiving the ball element: a bell crank lever fulcrumed on the draw bar assembly to swing within a vertical plane and having one end disposed to exert a forward pressure against said draw bar assembly at a location spaced away from the ball element on said assembly; a pair of elongated springs diverging in a direction away from said lever, said springs being anchored at their convergent ends to the other end of the lever and extending rearwardly from the lever below and in substantial parallelism with the tongue; depending shackles carried by the tongue and connecting the springs at their divergent ends to the tongue; cam means associated with said shackles for biasing the shackle-engaged ends of the springs upwardly in the direction of the tongue; and a screw threaded in the tongue and bearing downwardly against the springs intermediate the ends of the springs, for transmitting pressure against the lever through the springs tending to swing the lever into pressure-exerting engagement with the draw bar assembly at said one end of the lever, said cam means opposing the downward force of the screw to place added tension on the springs, in cooperation with the screw.

References Cited in the file of this patent

UNITED STATES PATENTS

| 2,453,941 | Smit | Nov. 16, 1948 |
| 2,546,206 | Arehart | Mar. 27, 1951 |
| 2,597,657 | Mathisen | May 20, 1952 |
| 2,643,891 | Mosley | June 30, 1953 |
| 2,653,822 | Martin | Sept. 29, 1953 |